United States Patent
Geary et al.

[11] 3,921,986
[45] Nov. 25, 1975

[54] SHAFT SEAL

[75] Inventors: Carl H. Geary, Greensburg; Owen S. Taylor, Jeannette, both of Pa.

[73] Assignee: Carrier Corporation, Syracuse, N.Y.

[22] Filed: July 10, 1974

[21] Appl. No.: 487,108

Related U.S. Application Data

[63] Continuation-in-part of Ser. No. 336,865, Feb. 28, 1973, abandoned.

[52] U.S. Cl. .................. 277/83; 277/74; 277/92
[51] Int. Cl.² ................................... F16J 15/34
[58] Field of Search ............ 277/83, 30, 92, 74, 75, 277/91, 87, 41

[56] References Cited
UNITED STATES PATENTS

| | | | |
|---|---|---|---|
| 2,679,412 | 5/1954 | Whitfield | 277/74 |
| 2,999,702 | 9/1961 | Dunn et al. | 277/83 X |
| 3,035,841 | 5/1962 | Riester | 277/83 X |
| 3,250,539 | 5/1966 | Kurz et al. | 277/41 |
| 3,547,452 | 12/1970 | Hirata | 277/30 |
| 3,589,738 | 6/1971 | Tracy | 277/74 |
| 3,612,548 | 10/1971 | Tracy | 277/74 |

Primary Examiner—Samuel B. Rothberg
Attorney, Agent, or Firm—J. Raymond Curtin; Thomas J. Wall

[57] ABSTRACT

A shaft seal assembly having an annular collar affixed to the shaft and arranged to rotate therewith, a nonrotatable sleeve encompassing the shaft being biased axially towards the collar and a free-floating carbon seal interposed therebetween. The assembly further includes a contact ring loosely positioned within a recess formed within the rotating collar and having a sealing surface adapted to ride in face-to-face sealing contact against the carbon ring. The contact ring is resiliently supported within the recess providing the assembly with sufficient flexibility to allow for shaft run-out without disturbing the integrity of the face-to-face sealing contact. Further means are provided to continually pass a flow of cooling fluid over the contact ring and the sealing ring to prevent excessive heating of the coacting sealing components.

3 Claims, 2 Drawing Figures

SHAFT SEAL

BACKGROUND OF THE INVENTION

This application is a continuation-in-part of copending application Ser. No. 336,865, filed Feb. 28, 1973 and now abandoned.

This invention relates to apparatus for use in rotary machinery for preventing a working substance from leaking about the shaft of the machine from the high pressure side of the system into the low pressure side.

More specifically, this invention relates to an improvement in an ISO-SEAL structure as conventionally utilized in relation to high speed rotating shafts. In this particular arrangement, an annular rotating element or collar is affixed to the shaft and coacts with a non-rotating sleeve through means of a free-floating carbon ring, interposed therebetween, to prevent working fluids from leaking about the shaft into surrounding areas of lower pressure. The sleeve of the sealing assembly is yieldably urged against the free-floating carbon ring so as to bias the ring in face-to-face contact against the rotating member. The outside of the assembly is flooded with oil to provide the necessary cooling.

In practice, a small amount of shaft run-out is normally unavoidable in most rotary machines because of the tolerances involved. A small amount of shaft run-out is generally magnified by the radially extending annular collar of the seal assembly which produces pronounced nutations in the sealing joint between the carbon ring and the rotating collar. This, in turn, leads to excessive localized wear and eventual leakage of the seal. Furthermore, in this type of sealing arrangement, the assembly is usually confined within a very limited area, usually being "dead-ended" against the rear wall of the machine closure. Circulation of coolants, such as oil or the like, through this restricted area becomes difficult to maintain and often times excessive heating of the sealing components is encountered. This, in turn, increases the wear problems involved and further shortens the life of the sealing assembly.

SUMMARY OF THE INVENTION

It is therefore an object of the present invention to improve shaft sealing apparatus.

Another object of the present invention is to minimize the effect of shaft run-out in a shaft sealing assembly utilizing a free-floating carbon seal ring arranged to ride in contact against the collar affixed to the shaft.

A still further object of the present invention is to improve the cooling of a shaft seal that is located within a confined area of a rotating machine.

These and other objects of the present invention are attained in a shaft sealing assembly having an annular collar affixed to a shaft for rotation therewith, a nonrotating sleeve encompassing the shaft and being biased axially towards the collar and a free-floating sealing ring interposed between the sleeve and the collar, the assembly further including a contact ring loosely positioned within a recess formed in the collar and being arranged to ride in face-to-face contact with the sealing ring, means for resiliently supporting the contact ring within the recess whereby the face-to-face contact is maintained independent of collar nutations, an aperture passing through the collar and the contact ring carried therein to provide a flow path for directing coolant over the sealing ring and means to bring a cooling fluid to the aperture whereby the cooling fluid is pumped along the flow path as the collar is rotated by the shaft.

BRIEF DESCRIPTION OF THE DRAWINGS

For a better understanding of the invention as well as other objects and further features thereof, reference is had to the following detailed description of the invention to be read in connection with the accompanying drawings, wherein.

DESCRIPTION OF THE PREFERRED EMBODIMENT

Figure 1:
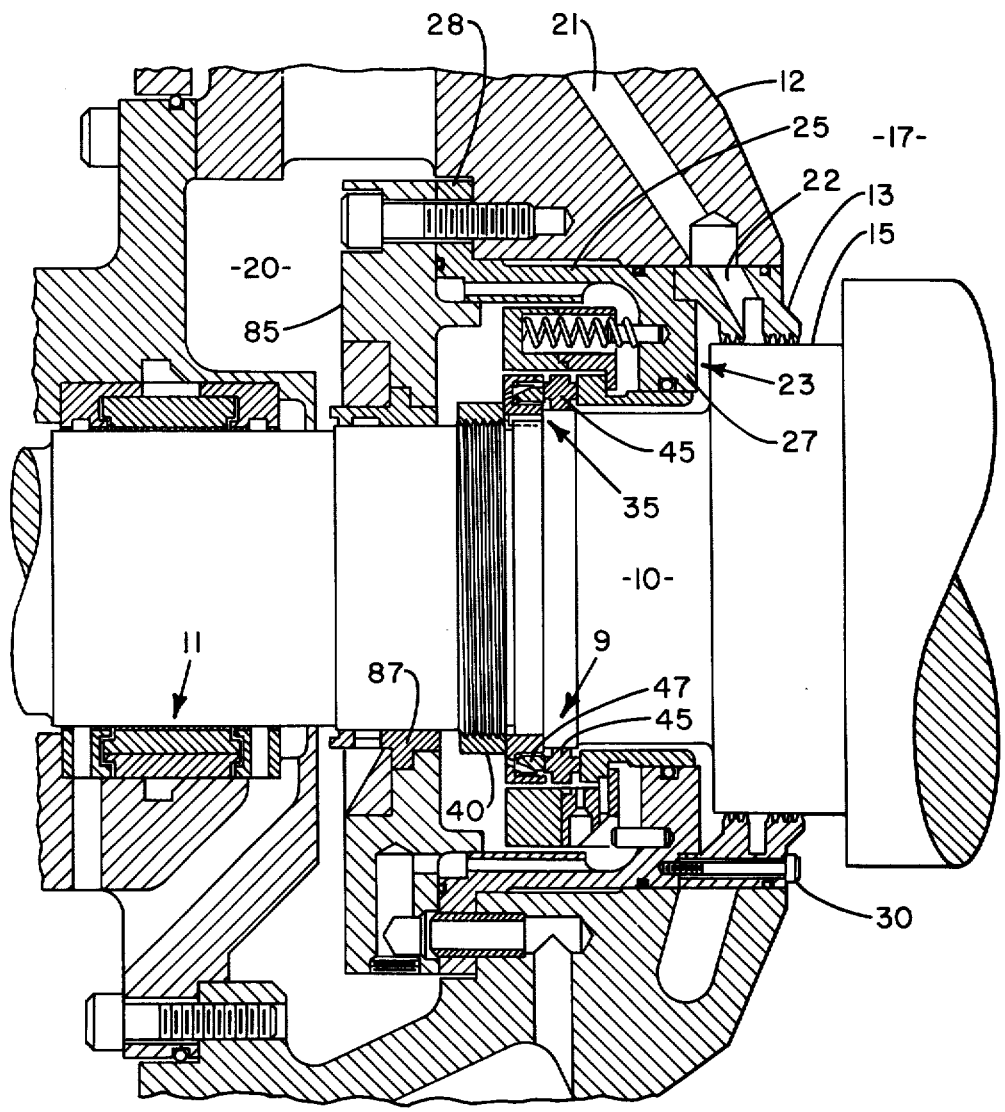
FIG. 1 is a sectional view of a rotary shaft seal structure embodying the present invention.

A shaft 10, is journaled for high speed rotation within bearings, one of which is shown at 11 in FIG. 1. The bearing 11 is mounted in a composite housing including a section 12 in which a labyrinth seal 13 is mounted and which, in conjunction with portion 15 of shaft 10, forms an initial seal to retard the passage of gas from high pressure region 17 along the shaft towards low pressure region 20. The casing portion 12 and seal 13 may be formed with conventional passages 21, 22 for conducting buffer gas under pressure to the seal 13. A Z-shaped member, generally 23, is formed having a cylindrical portion 25 mounted in the internal bore of section 12. This member is also formed with an inwardly extending radial flange portion 27 and an outwardly extending radial flange portion 28 at the opposite end thereof. The labyrinth seal 13 is fixedly secured to the flange 27, as for example, by screws 30.

Figure 2:
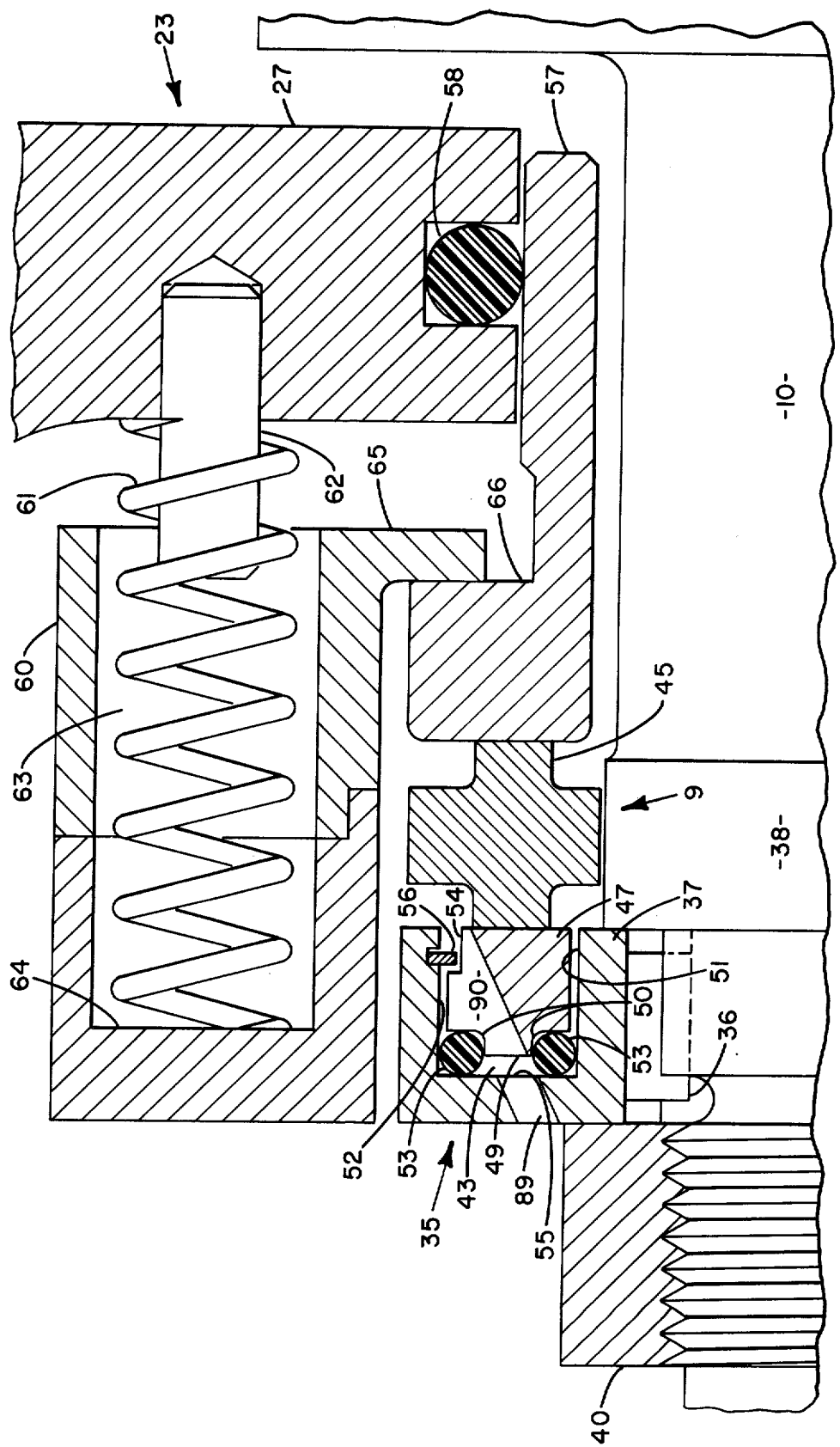
FIG. 2 is an enlarged view of the upper central portion of the structure shown in FIG. 1.

The sealing assembly, generally referenced 9, of the present invention includes an annular collar-like member 35 fixed to the shaft 10 by a key 36. The member 35 abuts against a shoulder 37 (FIG. 2) formed by the shaft enlargement 38, the member 35 being fixed against the shoulder by a nut 40 threaded to the shaft 10. This structural arrangement is best seen in FIG. 2.

The annular member 35 is formed with an annular recess 43. The open side of the recess confronts a free-sealing element 45. Element 45 is cruciform in cross section and has a running clearance between the inner surface thereof and shaft 10. Conventionally, the free-sealing element is formed of a carbon material. A contact ring 47 is positioned within the recess 43 of the annular member and is dimensioned for axial, radial and oblique movement therein. The inner side face 49 of the ring 47 is formed with two concentrically spaced grooves 50. A gasket ring 53, fabricated of a resilient material, is positioned in each groove 50. When seated in assembly, the two rings have contact with the inner and outer circular walls 51 and 52 of the recess, as well as with the rear wall 55 thereof. The resilient rings provide a flexible support against which the contact ring acts whereby the contact ring has sufficient flexibility of movement to be able to shift its position either axially, radially or obliquely in reference to the annular member when placed under normal operating conditions.

As is conventional in a shaft seal assembly of this type, there is also provided a non-rotating sleeve member 57 that encircles the shaft and has clearance therebetween. The sleeve 57 is slidably mounted within the bore of flange 27 carried by the Z-shaped member. An O-ring seal 58 is provided to prevent the passage of gas between the sleeve and the bore in flange 27.

A biasing member 60, which substantially encompasses the sealing assembly and the sleeve 57, is operatively connected to the flange 27 by means of a series of springs 61. As best seen in FIG. 2, the springs are supported upon pins 62 staked into the flange and are carried within apertures 63 formed in the body of the biasing member. In assembly, the springs act upon the interior end wall 64 of each aperture and serve to urge the biasing member to the left as viewed in the drawings. The biasing member also has a downwardly extending leg 65 which engages the raised section 66 of sleeve 57. In this arrangement, the left-hand end of sleeve 57 is thus yieldably pressed against the free-sealing element and the latter, in turn, urged against contact ring 47. The resilient gasket rings 53, acting against the spring pressure, function to maintain the contact ring in true, flat, face-to-face engagement with the abutting face of the free-sealing element. As can be seen, the resilient rings also provide the sealing assembly with sufficient flexibility whereby the system can accommodate nutations in the collar in the event that shaft run-out occurs, while still maintaining positive face-to-face contact between the contact ring and the free-sealing ring. Localized wearing of the contact surfaces is thus avoided while seal leakage is minimized, and the operating life of the system considerably extended.

As shown in FIG. 2, the contact ring 47 is loosely supported within annular member 35 by means of a retaining ring 56 secured in a complementary groove formed in the outer wall of the recess 43. The retaining ring extends inwardly into the recess and is adapted to loosely ride within an axially extending groove 54 formed in the contact ring. Sufficient clearance is provided between the retaining ring and the groove to permit the contact ring to move freely in an axial, radial, and oblique direction within the recess to accommodate any run-out of the annular member 35.

It is conventional to envelop the sealing structure shown in FIG. 2 with a lubricating oil delivered into the system under pressure. The oil is supplied through passages 80, 81, 82 and 83 to the area defined by the portions 25, 27 of the Z-shaped member 23 and an end cap 85 secured to housing 12 (FIG. 1). The oil passes from the area between the shaft 10 and the breakdown seal 87 carried by the end cap. The rear wall 55 of recess 43 is formed with one or more passages 89 extending therethrough. The passages 89, in turn, communicate with the space maintained between the inner end of the contact ring 47 and the rear wall 55 of the annular member 35. These passages also communicate with a second series of passages 90 formed within the body of the contact ring 47. The passages 89 and 90 thereby describe a flow passage which diverges outwardly from the axis of the shaft 10 by which the cooling oil, delivered in the system, can flow into contact with the free-sealing element 45. In this particular arrangement, when the annular member is rotating with the shaft 10, the passages 89 and 90 act as an impeller forming a centrifugal pump to force cooling oil through the flow passages and thus over the contact ring and the free-sealing element 45 to maintain the elements at a suitable operating temperature. Under the influence of the centrifugal pump, a continuous flow of oil is moved between the sealing assembly and the encompassing biasing member 60 thus preventing the oil from stagnating in this normally dead-end area.

While this invention has been described with reference to the structure disclosed herein, it is not confined to the details as set forth, and this application is intended to cover any modifications or changes that may come within the scope of the following claims.

What is claimed is:

1. In a shaft seal assembly having an annular member affixed to the shaft for rotation therewith, a sleeve encompassing the shaft and being biased axially towards said annular member and a free-floating sealing ring interposed between the annular member and the sleeve to prevent a pressurized working substance from leaking about said shaft, the improvement comprising
   - a contact ring mounted within an annular recess formed in the rotating annular member and having a substantially radial sealing surface arranged to ride in face-to-face contact with a coacting surface on the sealing ring,
   - at least one annular sealing gasket formed of a resilient material mounted within a circumferential groove formed in the contact ring and being arranged to seat against the rear wall and one side wall of the recess formed in the annular member for maintaining said face-to-face contact between the contact ring and the sealing ring independent of the position of the annular member,
   - at least one aperture passing through the rear wall of said annular member and said contact ring to define a flow path over which cooling fluid in capable of moving into contact with said free-floating sealing ring, and
   - means for bringing a cooling fluid to said aperture whereby the cooling fluid is pumped through said flow path under the influence of the rotating annular member into contact with the free-floating sealing bushing.

2. The seal assembly of claim 1 wherein the inner ends of said contact ring facing the rear wall of the recess in the annular member are formed with a pair of circumferentially extending concentrically spaced grooves, said grooves each containing a resilient member contacting the radial end wall of said recess and one axially extended side wall thereof.

3. The seal assembly of claim 1 having a plurality of circumferentially spaced apertures passing through the rear wall of said annular member and said contact ring.

* * * * *